US010325103B1

(12) United States Patent
Austin et al.

(10) Patent No.: US 10,325,103 B1
(45) Date of Patent: *Jun. 18, 2019

(54) SELECTIVELY OBSCURING AND/OR REVEALING SENSITIVE INFORMATION IN A DISPLAY OF A COMPUTING DEVICE

(71) Applicant: STATE FARM MUTUAL AUTOMOBILE INSURANCE COMPANY, Bloomington, IL (US)

(72) Inventors: Michael Paul Austin, Bloomington, IL (US); Erika Knittel, Heyworth, IL (US); Jacob L. Hadsall, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/921,804

(22) Filed: Mar. 15, 2018

Related U.S. Application Data

(63) Continuation of application No. 14/972,590, filed on Dec. 17, 2015, now Pat. No. 9,977,909.

(60) Provisional application No. 62/102,809, filed on Jan. 13, 2015.

(51) Int. Cl.
*G06F 21/00* (2013.01)
*G06F 21/60* (2013.01)
*G06F 3/0488* (2013.01)

(52) U.S. Cl.
CPC ........ *G06F 21/606* (2013.01); *G06F 3/04883* (2013.01)

(58) Field of Classification Search
CPC .......................... G06F 21/606; G06F 3/04883
See application file for complete search history.

(56) References Cited

U.S. PATENT DOCUMENTS

| | | | |
|---|---|---|---|
| 7,953,671 B2 | 5/2011 | Bishop et al. | |
| 8,462,949 B2 | 6/2013 | Anderson et al. | |
| 8,678,275 B1 | 3/2014 | Bowen et al. | |
| 9,600,680 B2 | 3/2017 | Rakshit | |

(Continued)

OTHER PUBLICATIONS

Dynamic Data Masking Using Guardium for Applications—PeopleSoft Example, https://www.youtube.com/watch?v=yH0XnR1Crmk&feature=youtu.be, Nov. 25, 2014, 1 page.

(Continued)

*Primary Examiner* — Mahfuzur Rahman

(57) ABSTRACT

A computer-implemented method may include (1) generating or receiving, at a computing device, display data defining a display layout and one or more fields; (2) providing, on a display screen of the computing device and by processing the display data, a display that initially obscures an item of information in a secure field without obscuring an entirety of the display; (3) detecting, using at least a camera of the computing device, a change in orientation of a user relative to the computing device; and (4) in response to the change in orientation, causing the display to show the item of information in the secure field, and after causing the display to show the item, (i) detecting an expiration of a predetermined time limit, and (ii) in response to detecting the expiration, causing the display to again obscure the item in the secure field without obscuring the entirety of the display.

20 Claims, 6 Drawing Sheets

(56) References Cited

U.S. PATENT DOCUMENTS

| | | | |
|---|---|---|---|
| 2003/0227555 | A1 | 12/2003 | Kobayashi et al. |
| 2010/0124363 | A1 | 5/2010 | Ek et al. |
| 2013/0144901 | A1 | 6/2013 | Ho et al. |
| 2013/0145474 | A1* | 6/2013 | Mergi .................. H04L 63/04 726/26 |
| 2014/0210763 | A1 | 7/2014 | Wells et al. |
| 2015/0067513 | A1* | 3/2015 | Zambetti ............... G06F 3/0482 715/716 |
| 2015/0334379 | A1 | 11/2015 | Du et al. |
| 2016/0042165 | A1* | 2/2016 | Nicholson .............. G06F 21/32 726/19 |

OTHER PUBLICATIONS

InfoSphere Guardium for Applications, https://www.ibm.com/developerworks/community/wikis/home?lang=en#!/wiki/Wf32fc3a2c8cb_4b9c_83e4_09b3c6f60e46/page/InfoSphere%20Guardium%20for%20Applications, Feb. 10, 2015, 1 page.

IBM Security Guardium for Applications, http://www-03.ibm.com/software/products/en/ibm-security-guardium-for-applications, 1 page.

* cited by examiner

SELECTIVELY OBSCURING AND/OR REVEALING SENSITIVE INFORMATION IN A DISPLAY OF A COMPUTING DEVICE

CROSS-REFERENCE TO RELATED APPLICATIONS

This is a continuation of U.S. patent application Ser. No. 14/972,590, entitled "Selectively Obscuring and/or Revealing Sensitive Information in a Display of a Computing Device" and filed on Dec. 17, 2015, which claims the benefit of U.S. Provisional Patent Application No. 62/102,809, entitled "Selectively Obscuring and/or Revealing Sensitive Information in a Display of a Computing Device" and filed on Jan. 13, 2015. The disclosures of all of the above-identified applications are hereby incorporated herein by reference in their entirety.

FIELD OF THE DISCLOSURE

The present disclosure generally relates to information security and, more specifically, to systems and methods for maintaining privacy with respect to information displayed on a computer screen.

BACKGROUND

Increasingly, individuals use mobile/portable computing devices to view their personal information online. For example, individuals use their smartphones, tablets, phablets, etc., to access online bank accounts containing account numbers, account balances and/or credit card numbers, online insurance accounts/policies containing policy numbers, coverage levels and/or social security numbers, and so on. Typically, all information is presented on the screen of the computing device in the same manner once a user is authenticated (e.g., enters a login and password), even though the user may only need to see the sensitive portions of the information for a relatively brief time period. As a result, other individuals in the vicinity of the user may easily see the sensitive information, increasing the risk of unauthorized use of the information (e.g., identity theft). Moreover, the size of the computer screens on which information is displayed to mobile users (e.g., tablet, phablet or smartphone touch screens) have generally been increasing in size, which may cause the displayed information to be larger and more easily seen by others in the vicinity of the screen, and/or may cause more sensitive information to be displayed at one time. Furthermore, the proliferation of camera devices (e.g., smartphone cameras) increases the risk that someone will capture an image of a display screen, and later view the image to identify any sensitive information contained therein.

Some conventional techniques require physically positioning a filter or lenticular film over a laptop computer screen such that information on the screen may only be read within a narrow viewing angle. Other conventional techniques do not require purchasing and positioning a physical filter or film, but have other drawbacks. For example, some applications allow a user to hide his or her password by replacing the typed password characters with asterisks or other characters/shapes (e.g., "•••••"), and further allow the user to selectively show or hide the password characters by clicking a virtual control box located next to the password field. These conventional techniques generally fail to provide a security mechanism that is user friendly. For example, the technique for hiding passwords described above requires that the user locate and activate a dedicated control positioned near the password field on the display (e.g., a clickable "SHOW" or "HIDE" text in the vicinity of the password field). As a result, the user may forget or otherwise neglect to obscure sensitive information after viewing. Moreover, the conventional techniques are restricted to hiding/showing the single field associated with the control (i.e., the password field).

BRIEF SUMMARY

The present embodiments may, inter alia, enable a user to easily and intuitively obscure and/or reveal sensitive information within a display of the user's computing device, which may in turn reduce the likelihood that other, nearby individuals will see or capture (e.g., photograph) the sensitive information and use the information for unauthorized purposes. In one embodiment, the user, by taking certain actions, may hide sensitive information on demand, and then return that information to being visible when desired, or vice versa.

In one aspect, a computer-implemented method of selectively obscuring sensitive information on a computer display may include: (1) generating or receiving, at a computing device, display data defining a display layout and one or more fields; (2) providing, on a display screen of the computing device and by processing the display data, a display that initially obscures a first item of information in a first secure field of the one or more fields without obscuring an entirety of the display; (3) detecting, using at least a camera of the computing device, a change in orientation of a user of the computing device relative to the computing device; and/or (4) in response to the change in orientation, (A) causing the display to show the first item of information in the first secure field; and (B) after causing the display to show the first item of information in the first secure field, (i) detecting an expiration of a predetermined time limit, and (ii) in response to detecting the expiration of the predetermined time limit, causing the display to again obscure the first item of information in the first secure field without obscuring the entirety of the display.

In another aspect, a computer device configured to selectively obscure sensitive information on a display screen may include a display screen, a camera, one or more processors and a non-transitory, computer-readable memory. The memory may store instructions that, when executed by the one or more processors, cause the computing device to: (1) generate or receive, at the computing device, display data defining a display layout and one or more fields; (2) provide, on the display screen of the computing device and by processing the display data, a display that initially obscures a first item of information in a first secure field of the one or more fields without obscuring an entirety of the display; (3) detect, using at least a camera of the computing device, a change in orientation of a user of the computing device relative to the computing device; and/or (4) in response to the change in orientation, (A) cause the display to show the first item of information in the first secure field; and (B) after causing the display to show the first item of information in the first secure field, (i) detect an expiration of a predetermined time limit, and (ii) in response to detecting the expiration of the predetermined time limit, cause the display to again obscure the first item of information in the first secure field without obscuring the entirety of the display.

In another aspect, a computer-implemented method of selectively obscuring sensitive information on a computer display may include: (1) generating or receiving, at a computing device, display data defining a display layout and one or more fields; (2) providing, on a display screen of the computing device and by processing the display data, a display that initially obscures a first item of information in a first secure field of the one or more fields without obscuring an entirety of the display; (3) detecting, using the computing device, a change in orientation of a user of the computing device relative to the computing device; and/or (4) in response to the change in orientation, (A) causing the display to show the first item of information in the first secure field; and (B) after causing the display to show the first item of information in the first secure field, (i) detecting an expiration of a predetermined time limit, and (ii) in response to detecting the expiration of the predetermined time limit, causing the display to again obscure the first item of information in the first secure field without obscuring the entirety of the display.

BRIEF DESCRIPTION OF THE DRAWINGS

The Figures described below depict various aspects of the system and methods disclosed herein. It should be understood that each figure depicts an embodiment of a particular aspect of the disclosed system and methods, and that each of the Figures is intended to accord with a possible embodiment thereof.

DETAILED DESCRIPTION

Figure 1:
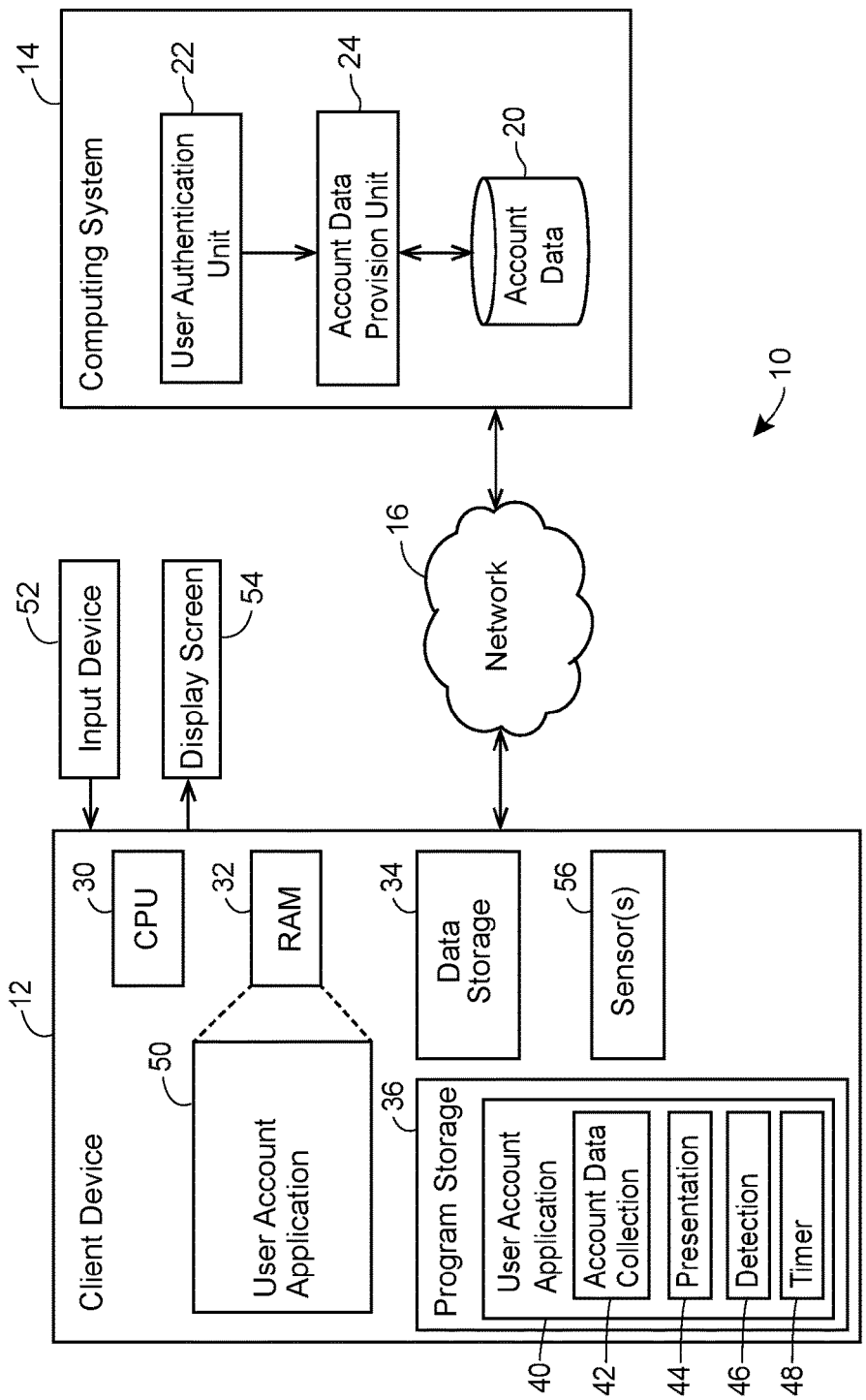
FIG. 1 depicts an exemplary environment including components associated with providing a user with the ability to selectively obscure and/or reveal sensitive information in a display of a computing device, according to an embodiment.

I. Exemplary Obscuring and/or Revealing of Sensitive Information on a Computing Device Display The present embodiments relate to concealing sensitive information displayed on a display screen of a computing device. The computing device may be a portable/mobile computing device, such as a tablet, phablet, smartphone, smart glasses, smart watch, notebook computer or laptop computer, wearable electronics, other computing devices configured for wireless RF (radio frequency) communication, for example. Alternatively, in some embodiments, the computing device may be a desktop computer, or another stationary or semi-stationary computing device. The display screen may be an output (or input/output) component or device of the computing device, such as a smartphone touch screen, a tablet touch screen or a laptop monitor, for example.

Depending upon the embodiment and/or scenario, "sensitive" information may include any manner of information/ data, such as identification codes/numbers (e.g., passwords, user names, social security numbers, etc.), account numbers (e.g., bank account numbers, credit card numbers, insurance policy numbers, etc.), names, dates, phone numbers, addresses, salary information, financial information (e.g., account balances, descriptions of past financial transactions, portfolio information, etc.), legal information, medical records and/or confidential business information, for example. The sensitive information may be provided to a user of the computing device in connection with a secure account, such as a bank account, an investment/trading account, an insurance account, and/or an employee account (e.g., an account for accessing an application/tool that helps the user to perform his or her job functions), for example.

In the context of an automobile (and/or other) insurance account, for example, the sensitive information may include the account/policy number, the premium, the coverage types, levels and/or deductibles, vehicle information, names of associated individuals (e.g., other drivers), and so on. The insurance accounts may relate to automobile, home owners, renter, life, health, pet, or other types of insurance. The sensitive information may also include text and/or other content, such as images and/or video, for example.

In some embodiments, a dedicated application running on the user's computing device may generate display data for a display that is to be presented on the display screen of the computing device. The display data may define the layout/ presentation of the display, and/or some or all of the content of the display, for example. In some embodiments, the application may obtain additional content for one or more fields of the display, including one or more pieces of sensitive information, from a remote server. For example, the application may receive or retrieve, in a "push" or "pull" manner, account information (e.g., account numbers, account balances, etc.) from a third party server (e.g., a bank server, investment/trading company server, insurance provider remote server or other processors, etc.) after the user enters a valid login and/or password. Alternatively, the application may obtain all content, including the sensitive information, from a local storage of the computing device, and/or based upon information that the user entered using a keyboard or other input device. In other embodiments, a web browser application running on the user's computing device may access a web page to obtain the display data, including some or all of the sensitive information within the display content. The web page may be stored on a third party server (e.g., bank server, insurance provider server, etc.), and accessed by entering a valid login and/or password on a login web page, for example.

The display data, when processed by the user's computing device, may cause the display screen to present a display that may include one or more fields for various kinds of information associated with the account. For a bank account, for example, the display may include one or more account number fields (e.g., checking account number, savings account number, etc.), one or more account balance fields, a field for the user's name, one or more fields for a list of recent transactions, etc. Some or all of the fields may be designated as "secure fields" associated with a security feature. For example, an application executing on the user's computing device may include field type data that indicates which fields will or may contain sensitive information.

Alternatively, a third party server that provides field contents/values may provide not only the content/values, but also data flags indicating which pieces of information are sensitive. In this manner, the entity providing the data may control which information in the display is categorized as "sensitive" information.

A local application executing on the user's computing device, and/or a third party server (e.g., via a web page), may also include or provide instructions that specify when information in the secure field(s) is to be obscured and/or revealed. For example, the instructions may specify whether information in secure fields is initially shown or hidden, and which user actions (and/or other triggers) will cause the information to be obscured or revealed. As a more specific example, the instructions may specify that information in the secure field(s) is initially hidden, and that the user may cause the information to be revealed by tilting the computing device to any angle other than the starting angle (e.g., other than the angle of the device when the display was first presented to the user), by swiping his or her finger on the display screen, by moving his or her head relative to the computing device, by tapping (or tapping and holding) a specific area of the display, and/or by performing some other action. As another example, the instructions may specify that information in the secure field(s) is initially shown, and that the user may cause the information to be obscured by swiping his or her finger on the display screen, by turning his or her head/face away from the display screen, by shifting the computing device such that the user's eyes are no longer in the same position relative to a front-facing camera (e.g., a camera mounted on or near the display screen), and/or by performing some other action.

In some embodiments, a single type of action may cause the information to toggle back and forth between hidden/revealed states. For example, the user may swipe his or her finger on the display screen to reveal information in the secure field(s), and/or swipe his or her finger again in the same manner to again hide that information. In other embodiments, different types of actions may cause the information to be hidden and revealed. For example, the user may swipe his or her finger on the display screen to reveal the information, and turn his or her eyes and/or face away from the display screen to again hide the information. In still other embodiments, a timer may dictate how long information is revealed. For example, the user may swipe his or her finger (or move his or her head, etc.) to reveal information that was initially obscured, and the information may automatically be obscured again when a timer expires (e.g., 2 seconds after the information was revealed, 4 seconds after the information was revealed, etc.).

The triggers for obscuring and/or revealing information may be global to multiple (e.g., all) secure fields in the display. For example, a user may swipe his or her finger over any portion of a display screen (or a specific portion of the display screen) a single time to hide information in all of the secure fields, and/or may cause the information in all of the secure fields to be hidden by turning his or her face away from the display screen a single time, etc. In other embodiments, triggers may be specific to particular secure fields in a display. For example, a user may swipe his or her finger over information shown in a first field of the display to hide only that information (e.g., a social security number), and swipe his or her finger over information in a different, second field of the display to hide only that information (e.g., an account balance).

The instructions included in a local application, and/or provided by a remote server, may also specify the manner in which information in the secure field(s) is obscured and/or revealed. For example, information in the secure fields may be obscured by blurring the information according to a suitable image processing algorithm when the appropriate trigger occurs. As another example, the information may be obscured by blacking out (or graying out, etc.) the information substantially or entirely when the appropriate trigger occurs. As yet another example, obscured information may be revealed instantly when the appropriate trigger occurs, or may gradually become clear (un-blurred), gradually "fade in," etc.

Some or all of the features described above, and/or elsewhere herein, may provide one or more of various advantages. For example, users may conceal and reveal their personal information (and/or other sensitive information, such as confidential information of an employer) with greater ease, in a more intuitive manner, and/or, for some embodiments (e.g., where information is hidden/revealed in response to head and/or eye movements), without consciously deciding to do so. As a result, sensitive information may be concealed from others (e.g., "eavesdroppers") in a more reliable fashion.

II. Exemplary Environment for Enabling a User to Selectively Obscure and/or Reveal Sensitive Information in a Computing Device Display FIG. 1 depicts an exemplary environment 10 including components associated with providing a user with the ability to selectively obscure and/or reveal sensitive information in a display of a computing device, according to an embodiment. As illustrated in FIG. 1, the environment 10 may include a client device 12 and/or a computing system 14. The computing system 14 may include one or more servers of a commercial or non-commercial entity such as a bank, an insurance provider, an investment/trading company, etc. The user of client device (or mobile device) 12 may be a customer, employee or associate of the entity, for example. In the example environment 10, the computing system 14 may be communicatively coupled to the client device 12 via a network 16. Network 16 may be a single communication network, or may include multiple communication networks of one or more types (e.g., one or more wired and/or wireless local area networks (LANs), and/or one or more wired and/or wireless wide area networks (WANs) such as the Internet).

The computing system 14 may include one or more types of persistent memory storing account data 20. Account data 20 may include account data associated with a number of different individuals, such as bank account information of bank customers (e.g., account holder names, account numbers, current account balances, transaction history information, etc.) or policy information of insurance customers (e.g., policyholder names, policy numbers, coverage types/levels, information about covered properties, etc.), for example. The computing system 14 may also include a user authentication unit 22. Generally, the user authentication unit 22 may determine whether user authentication information (e.g., logins, passwords and/or tokens) entered by users at client devices is valid, and/or may determine which account information in account data 20 corresponds to which user authentication information. The computing system 14 may further include an account data provision unit 24. Generally, the account data provision unit 24 may provide the appropriate portions of the account data 20 to users in response to the user authentication unit 22 verifying the users' credentials. For example, the account data provision unit 24 may send the appropriate account information to a user each time that the user logs in, and/or may "push" account information to a user on a regular basis after the user logs in a single time, etc.

In some embodiments, the user authentication unit 22 and the account data provision unit 24 may each be (or may each include) a respective set of one or more processors that executes software instructions to perform the functions described herein, and/or the user authentication unit 22 and the account data provision unit 24 may share a set of one or more processors. Alternatively, one or both of the user authentication unit 22 and the account data provision unit 24 may be a component of software that is stored on a computer-readable medium (e.g., a random access memory (RAM) and/or read-only memory (ROM) of the computing system 14) and executed by one or more processors of the computing system 14 to perform the functions described herein. In some embodiments, the computing system 14 may include more, fewer and/or different units than are shown in FIG. 1, including any of the components discussed elsewhere herein. For example, the computing system 14 may omit the user authentication unit 22, may store a set of business rules associated with management of user accounts (e.g., for determining which types of account information should be provided to a particular user), and so on.

While many users (e.g., account holders) may have computing devices in communication with the computing system 14, for clarity FIG. 1 illustrates only the example client device 12 of a single user. As illustrated in FIG. 1, the client device 12 may include a central processing unit (CPU) 30 to execute computer-readable instructions, a RAM 32 to store the instructions and data during operation of programs, a data storage 34 that may include persistent memory to store data used by the programs executed by CPU 30, and a program storage 36 that may include persistent memory to store the programs/instructions executed by CPU 30. By way of example, the data storage 34 and/or the program storage 36 may be implemented on a hard disk drive coupled to CPU 30 via a bus (not shown in FIG. 1). More generally, the components 30, 32, 34 and 36 may be implemented in any suitable manner according to known techniques. The client device 12 may be a portable/mobile device (e.g., a smartphone, tablet, phablet, laptop, pager, PDA (personal digital assistant), smart watch or bracelet, smart glasses, wearable electronics, etc.), a personal computer (e.g., a desktop), or any other suitable computing device, and may be configured for wired and/or wireless communication via network 16. While the client device 12 in the example of FIG. 1 may include both storage and processing components, the client device 12 may instead be a so-called "thin" client that depends upon another computing device for certain computing and/or storage functions. For example, data storage 34 and/or program storage 36 may be external to the client device 12 and connected to the client device 12 via a network link.

The program storage 36 may store a user account application 40 that is generally configured to obtain account data and present that account data to the user. The user account application 40 may be a native application that was downloaded from a server of the computing system 14, or was pre-installed on the client device 12 prior to use by the user, for example. To support the functionality of the user account application 40, the user account application 40 may include an account data collection module 42, a presentation module 44, a detection module 46 and a timer module 48. In some embodiments, the user account application 40 may include more, fewer and/or different modules than are shown in FIG. 1 (e.g., timer module 48 may be omitted, etc.). The functionality of the user account application 40 and the modules 42, 44, 46 and 48 will be described in further detail below, according to various embodiments. When CPU 30 executes the user account application 40, RAM 32 may temporarily store the instructions and data required for its execution. In FIG. 1, the user account application 40 being executed is represented in the program space of RAM 32 as user account application 50.

The client device 12 may be coupled to an input device 52 that allows the user to enter inputs to the client device 12, and a display screen 54 that allows the user to view outputs/displays generated by the client device 12 (e.g., outputs/displays generated by CPU 30 and/or a graphics processing unit not shown in FIG. 1). The input device 52 may include a pointing device such as a mouse, keyboard, trackball device, digitizing tablet or microphone, for example. The display screen 54 may be the screen of a laptop, smartphone, or tablet, for example. Using the input device 52 and the display screen 54, a user may be able to interact with graphical user interfaces (GUIs) provided by the client device 12.

The client device 12 may also include one or more sensors 56. Generally, the sensor(s) 56 may detect user actions, and/or movements of the client device 12 (and/or movements of a portion of the client device 12). For example, sensor(s) 56 may include an image or video camera that is mounted on or near the display screen 54, and faces the user as he or she views the display screen 54. As another example, sensor(s) 56 may include an accelerometer that generates an output indicative of movement of the client device 12 (e.g., tilt, side-to-side movement, etc.). As yet another example, sensor(s) 56 may include a sensor that generates an output indicative of gestures that the user makes on the display screen 54. For example, the input device 52, display screen 54 and one or more of sensor(s) 56 may be integrated to provide a touch screen that both presents visual displays and detects user inputs (e.g., tap, tap and hold, swipe, etc.).

In operation, a user of the client device 12 may access his or her account information by launching the user account application 40. When the user account application 40 is launched, the account data collection module 42 may provide a user interface on the display screen 54 that allows the user to enter his or her authentication information (e.g., login, password, token, etc.). In some embodiments, however, the account data collection module 42 does not require entry of authentication information, or only requires entry of authentication information once (e.g., when the user account application 40 is launched for the first time), etc. The account data collection module 42 may provide any entered authentication information to the computing system 14 via network 16 (e.g., using a network interface of client device 12 not shown in FIG. 1). The user authentication unit 22 may then process the authentication information to determine whether the user is an authorized user. To this end, the user authentication unit 22 may access account data 20, or another database not shown in FIG. 1, to determine whether the authentication information matches any account for which information is stored in account data 20.

If the user is authorized, the user authentication unit 22 may generate data indicating the authorization, including data identifying the user, and provide that data to the account data provision unit 24. The account data provision unit 24 may then retrieve the account information from account data 20 that is associated with the identified user, and/or provide that information to the client device 12 via network 16 (e.g., using a network interface of computing system 14 not shown in FIG. 1). The account data collection module 42 may then receive the account information, and the presentation module 44 may generate a display that provides the received account information to the user on the display screen 54. In some embodiments, the account data provision unit 24 of the computing system 14 may instead (or also), on a periodic or other basis, provide the most recent account information to the client device 12, without receiving specific requests for that information. That is, the account data provision unit 24 may "push" the account information to the client device 12.

Figure 2A:
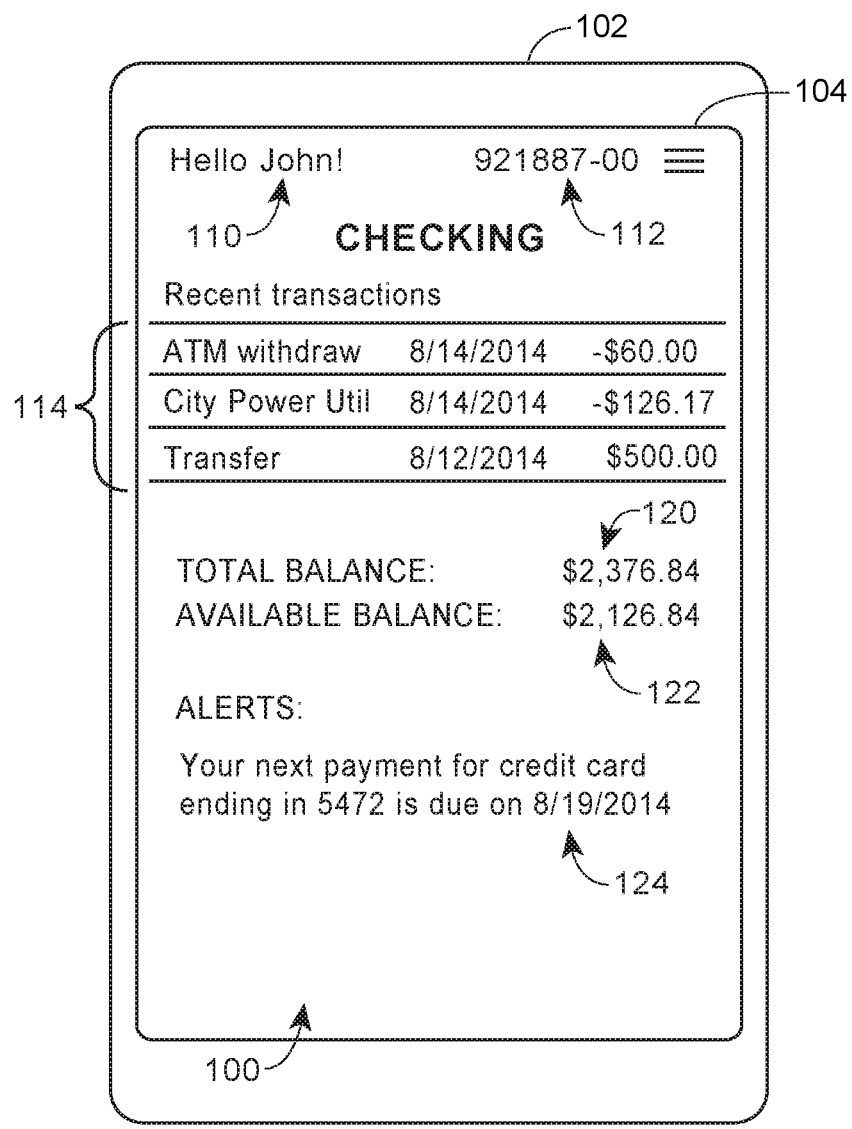
FIG. 2A depicts an exemplary computing device display on which a user may selectively obscure and/or reveal sensitive information, according to an embodiment and scenario.
Figure 2B:
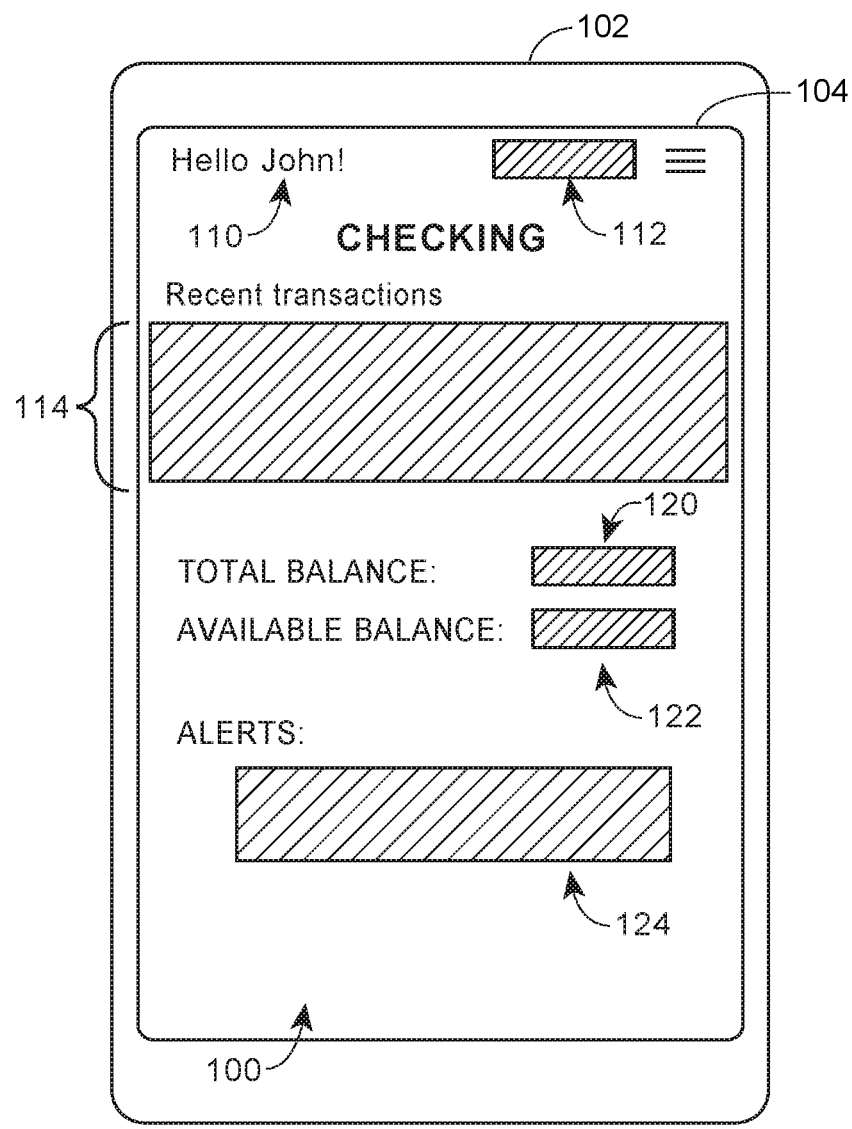
FIG. 2B depicts the exemplary computing device display of FIG. 2A after the user has obscured sensitive information, according to an embodiment and scenario.

The display provided on the display screen 54 may be arranged according to instructions of the presentation module 44. For example, the instructions may specify locations and/or text descriptors of one or more fields for displaying account information. In one embodiment and/or scenario in which the user account application 40 is an application for viewing bank account information, for example, the display may include fields for account number, account balance, transaction history, etc. In another example embodiment and/or scenario in which the user account application 40 is an application for viewing insurance policy information, the display may include fields for policyholder name, policy number, coverage types, deductibles, limits, claim history information, discounts, etc. One example of a display that may be generated by the presentation module 44 is shown in FIGS. 2A and 2B, discussed below. In some embodiments, the presentation module 44 may generate the display prior to the account data collection module 42 receiving the account information, such that some or all of the display fields are initially empty (or contain a default value, old value, etc.) until the presentation module 44 can populate the fields.

In an embodiment, the fields of the display may include one or more fields that the presentation module 44 designates as "secure" fields for holding sensitive information. Alternatively, the presentation module 44 may not differentiate between fields in this manner, and instead may check for data flags associated with the information that the presentation module 44 uses to populate the fields. In this latter embodiment, the account data provision unit 24 may determine which field information is sensitive (e.g., by checking a designation in the account data 20 and/or a set of business rules stored in a memory of the computing system 14), and flag those values so that the presentation module 44 may treat them accordingly. In either of these embodiments, the presentation module 44 may treat one or more fields as containing sensitive information, and the remaining fields, if any, as containing non-sensitive information.

The presentation module 44 may determine when the sensitive information in the display is to be obscured and/or revealed. For example, the presentation module 44 may initially hide the sensitive information, or may initially show the sensitive information. In some embodiments, the user may configure settings to determine whether the presentation module 44 initially hides or shows the sensitive information. The presentation module 44 may hide/obscure information by blurring the information according to a suitable image processing algorithm (e.g., Gaussian blurring), or by using another suitable technique (e.g., blacking out or graying out the information, etc.).

The presentation module 44 may also change the state of the sensitive information (e.g., from hidden to shown, or from shown to hidden) based upon predetermined triggers generated by the detection module 46. The detection module 46 may generate the triggers by processing the information generated by sensor(s) 56 to identify triggering events. For example, the detection module 46 may generate a trigger when a video camera of sensor(s) 56 provides video images indicating that the user has moved his or her eyes away from the display screen 54 for more than some threshold amount of time, that the user has shifted his or her head such that the position of the user's eyes has moved relative to the display screen 54, that the user has turned his or her head/face away from or towards the display screen, etc. As another example, the detection module 46 may generate a trigger when one or more accelerometers of sensor(s) 56 generate an output indicating that the client device 12 has been moved in a particular direction and/or manner (e.g., has been tilted), has been moved by a threshold amount, has been moved with a threshold acceleration or velocity, etc. As yet another example, the detection module 46 may generate a trigger when a touch screen sensor of sensor(s) 56 generates an output indicating that the user has made a particular gesture (e.g., swipe) on the display screen 54, or indicating that the user has tapped and held a specific area of the display screen 54, etc.

In some embodiments, the presentation module 44 may also change the state of the sensitive information (e.g., from hidden to shown, or from shown to hidden) based upon a trigger generated by the timer module 48. For example, the timer module 48 may start running a timer when sensitive information that was initially hidden is revealed, and inform the presentation module 44 that the sensitive information should again be obscured when the timer has expired (e.g., reached a predetermined timer threshold value).

As seen from the above examples, sensitive information may be obscured and/or revealed in response to numerous different triggers and/or trigger combinations in different embodiments. If the presentation module 44 initially obscures the sensitive information, for example, the presentation module 44 may reveal the sensitive information in response to the user swiping his or her finger on the display screen 54 a first time (or tapping and holding a specific area of the display screen 54, and/or moving his or her head relative to the display screen 54, etc.), and then may again obscure the sensitive information in response to the user swiping his or her finger on the display screen 54 a second time (or tilting the client device 12, and/or turning his or her face away from the display screen 54, etc.), or in response to the timer module 48 indicating that a timer has expired. In other example embodiments, if the presentation module 44 initially shows the sensitive information, the presentation module 44 may obscure the sensitive information in response to the user tilting the client device 12 (or swiping his or her finger on the display screen 54, or tapping and holding a specific area of the display screen 54, or turning his or her head relative to the display screen 54, and/or shifting the client device 12 such that the user's eyes are no longer in the same position relative to a front-facing camera of sensor(s) 56, etc.), and then may reveal the sensitive information again in response to the user swiping his or her finger (or tapping and holding a specific area of the display screen 54, and/or moving his or her head relative to the display screen 54, etc.).

In some embodiments, a single type of action may cause the presentation module 44 to toggle the visibility of the sensitive information back and forth between hidden/revealed states. As noted above, for example, the presentation module 44 may reveal initially hidden sensitive information when the user swipes his or her finger on the display screen 54 a first time, and again obscure the sensitive information when the user swipes his or her finger a second time in the same manner. As another example, the presentation module 44 may obscure initially shown sensitive information when the user turns his or her head/face away from the display screen 54, and again reveal the sensitive information when the user turns his or her head/face back towards the display screen 54. In other embodiments, different types of actions may cause the presentation module 44 to hide and reveal the sensitive information. For example, the presentation module 44 may reveal initially hidden sensitive information when the user swipes his or her finger on the display screen 54, and again obscure the sensitive information when the user turns his or her head/face away from the display screen 54.

The presentation module 44 may obscure and reveal all sensitive information in the display (e.g., all information in the field(s) designated as "secure" by the user account application 40, and/or all information designated as sensitive when provided to the client device 12 by the account data provision unit 24, etc.) in unison based upon a single trigger. For example, the presentation module 44 may obscure all sensitive information in the display in response to the user swiping his or her finger on the display screen 54 (and/or turning his or her face away from the display screen 54, etc.) a single time, and/or may reveal all sensitive information in the display in response to the user again swiping his or her finger on the display screen 54 (or moving his or her head relative to the display screen 54, etc.) a single time. In other embodiments, the presentation module 44 may obscure and/or reveal different portions of the sensitive information based upon different triggers (e.g., triggers specific to one or more particular secure fields of the display, etc.). For example, the presentation module 44 may toggle the visibility of only information in a first field of the display in response to the user swiping his or her finger over the first field, and may toggle the visibility of only information in a different, second field of the display in response to the user swiping his or her finger over the second field.

While the environment 10 shown in FIG. 1 and described above corresponds to an exemplary embodiment in which the display is generated and controlled by user account application 40 executing on the client device 12, in other embodiments the display may be generated and controlled (e.g., sensitive information may be obscured and/or revealed) according to instructions of one or more web pages. For example, the account data provision unit 24 may include one or more web pages with HyperText Markup Language (HTML) instructions, JavaScript instructions, JavaServer Pages (JSP) instructions, and/or any other type of instructions suitable for defining the content and presentation of the display, and the program storage 36 of the client device 12 may include a web browser application that the user can launch to access the web page(s).

As can be seen from the above discussion, the components in the environment 10, when using the above techniques, may enable a user to selectively conceal and reveal sensitive information within a display without any significant interruption to his or her perusal of non-sensitive information in the display (e.g., without covering the display screen 54 entirely, closing any windows, powering down the client device 12, etc.). In some embodiments, the sensitive information may quickly be concealed at the user's bidding (e.g., by quickly tilting the user's tablet or smartphone when the user notices someone else approaching), and/or may be concealed without the user needing to make a conscious decision to do so (e.g., in embodiments where sensitive information is concealed when the user looks away from the display screen).

III. Exemplary Computing Device Display on which a User May Selectively Obscure and/or Reveal Sensitive Information FIGS. 2A and 2B depict an exemplary display 100, of a computing device 102 having a display screen 104, on which a user may selectively obscure and/or reveal sensitive information, according to an embodiment and scenario. With reference to FIG. 1, for example, the computing device 102 may be the client device 12, the display screen 104 may be the display screen 54, and the display 100 may have been generated by the presentation module 44 of user account application 40. Alternatively, the display 100 may have been generated according to the instructions of a web page stored in a memory of the computing system 14, or may have been generated in another suitable manner. It is understood that the display 100 is just one example corresponding to the field of personal banking. In other embodiments and/or scenarios, the display 100 may instead provide information associated with an insurance policy or account, information associated with a trading/investment account, information associated with performing particular job functions, or any other type of information that may be, or may include, sensitive information. In embodiments where the display 100 is an interactive user interface, the display screen 104 may be a touch screen, and the display 100 may include virtual controls responsive to touch control by the user. Alternatively, the user may interact with the display 100 via other types of input, such as mouse clicks and mouse movement, touching a touch pad on a lap top computer, etc., or the display 100 may be purely informational and unresponsive to any user inputs (other than the actions that cause sensitive information to be obscured and/or revealed, as discussed below).

The display 100 may include one or more fields for displaying information. In the example embodiment of FIGS. 2A and 2B, for example, the display 100 includes a name field 110 for displaying the name of the account holder, an account number field 112 for displaying the checking account number of the account holder, a transaction history field 114 for displaying recent checking account transactions of the account holder (or, alternatively, a separate field for each of the recent transactions), a total balance field 120 for displaying the total checking account balance for the account holder, an available balance field 122 for displaying the currently available checking account balance for the account holder, and/or an alert field 124 for displaying alerts to the account holder. In other embodiments and/or scenarios, the display may include more, fewer and or different fields than are shown in FIGS. 2A and 2B.

FIGS. 2A and 2B correspond to an example embodiment and scenario in which the name field 110 is not a secure field, while all of fields 112, 114, 120, 122 and 124 are secure fields for sensitive information, and in which all information (including sensitive information) is initially shown rather than being hidden. When the user takes the appropriate triggering action (e.g., tilting the computing device 102, swiping his or her finger across the display screen 104, turning his or head/face away from the display screen 104, and/or any other action described above in connection with FIG. 1), the display 100 shown in FIG. 2A may change to appear as shown in FIG. 2B. As seen in FIG. 2B, the information in each of the secure fields 112, 114, 120, 122 and 126 has been obscured/redacted (e.g., grayed out or blacked out), while the information (name) in the non-secure field 110 continues to be shown. In other embodiments, the information in each of the secure fields 112, 114, 120, 122 and 126 may instead be blurred according to an image processing algorithm (e.g., using Gaussian blurring), or may be obscured in another manner. In some embodiments, however, the information in each of the secure fields 112, 114, 120, 122 and 126 may be obscured in a manner that cannot be "reverse engineered" to reveal the information (e.g., by applying an inverse of the image processing that was used to blur the information, and/or by using an image processing algorithm to sharpen edges contained in the image, etc.).

As discussed above in connection with FIG. 1, the information in the secure fields may, once obscured, be revealed again when a timer expires, and/or when the user takes a subsequent action (e.g., tilts the computing device 102, swipes his or her finger across the display screen 104, turns his or head/face back towards the display screen 104, or any other action described above in connection with FIG. 1). At that time, the display 100 may return to the state shown in FIG. 2A, for example.

The treatment of fields 112, 114, 120, 122 and 124 as secure fields may be based upon field type designators permanently associated with those fields (or configured by the user to be associated with those fields), and/or may be based upon data flags accompanying the various values (e.g., name, account number, etc.) when those values are received by the computing device 102, for example. Moreover, in some embodiments and/or scenarios, the display 100 may instead be initially presented to the user/account holder as shown in FIG. 2B (with secure fields obscured), and a user action (e.g., swipe, tilt, etc.) may be required to change the display 100 to that shown in FIG. 2A (with secure fields revealed).

Figure 3:
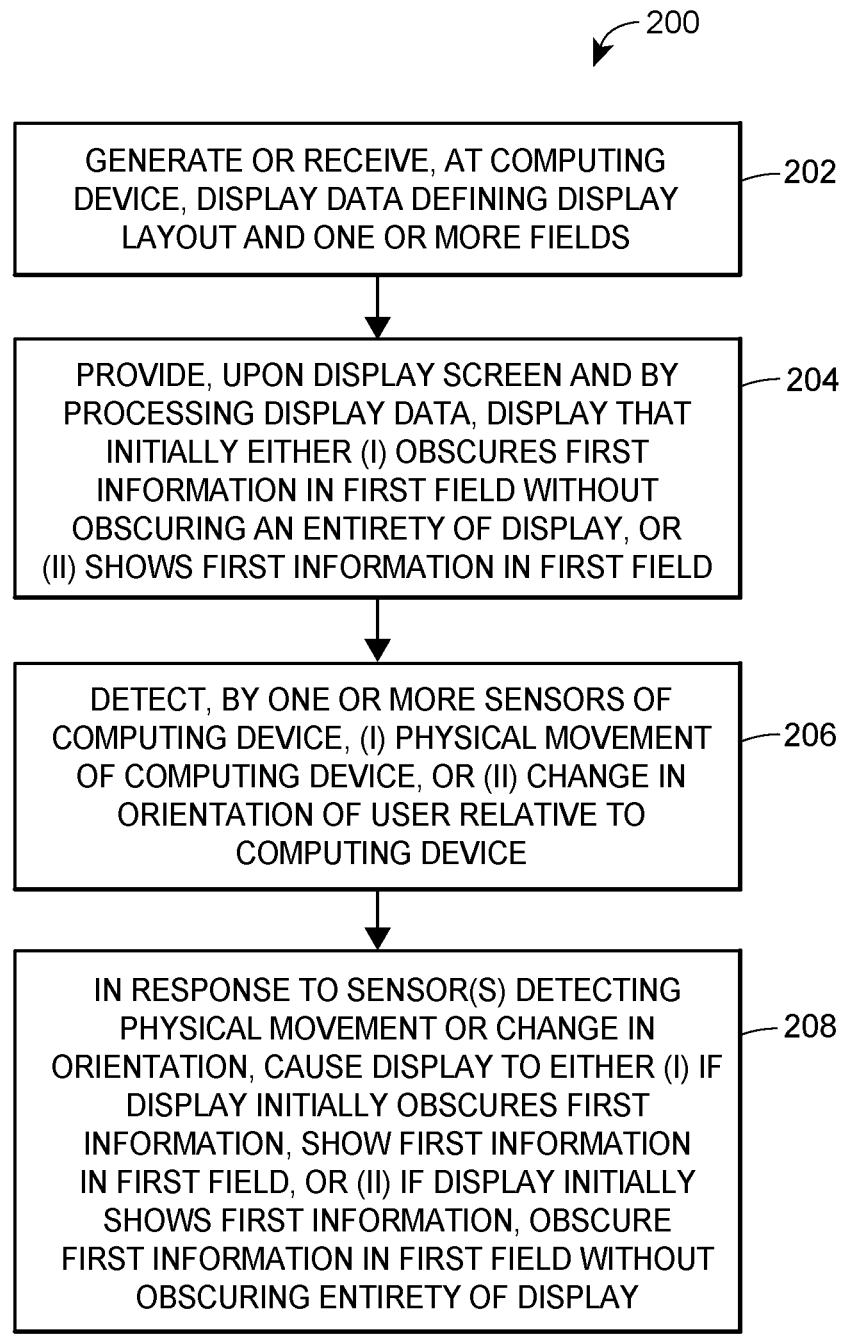
FIG. 3 depicts a flow diagram of an exemplary method for selectively obscuring and/or revealing sensitive information in at least one field of a display of a computing device, according to an embodiment.

IV. Exemplary Process Flow for Selectively Obscuring and/or Revealing Sensitive Information in at Least One Field of a Computing Device Display FIG. 3 depicts a flow diagram of an exemplary method 200 for selectively obscuring and/or revealing sensitive information in at least one field of a display of a computing device, according to an embodiment. In one embodiment, the method 200 may be implemented in (e.g., performed by one or more processors of) a computing device such as the client device 12 of FIG. 1, for example.

In the method 200, display data defining a display layout and one or more fields may be generated, or received, at a computing device (block 202). The computing device may be similar to the client device 12 of FIG. 1 or the computing device 102 of FIGS. 2A and 2B, for example. The display data may be generated at the computing device if the device is executing an application similar to user account application 40 of FIG. 1, or may be received at the computing device if the display data is provided by a web page, for example.

A display may be provided upon a display screen of the computing device (e.g., display screen 54 of FIG. 1) by processing the generated or received display data (block 204). Initially, upon being shown to the user, the display may either obscure first information in a first field of the field(s) defined by the display data (e.g., by blurring the first information, blacking out the first information, etc.) or show the first information in the first field. If the display initially obscures the first information in the first field, other portions of the display (e.g., text field descriptors, information in other fields, etc.) may remain visible. While the method 200 is described with respect to obscuring/revealing first information in a first field, it is understood that information in one or more other fields may also, in some embodiments, be obscured and/or revealed in the same manner, and/or based upon the same triggers (e.g., user actions, timer expirations, etc.).

A physical movement of the computing device, or a change in the orientation of a user of the computing device relative to the computing device, may be detected by one or more sensors of the computing device (block 206). The sensor(s) may be similar to sensor(s) 56 of FIG. 1, for example. Detecting the physical movement or change in orientation may include detecting whether the user is looking at the display screen (e.g., if the sensor(s) include a camera that can sense the direction or focus of the user's gaze), detecting that the user has moved the computing device relative to the user (e.g., if the sensor(s) include a camera that can sense the position of the user's head and/or shoulders relative to the display screen), and/or detecting that the computing device has been tilted (e.g., if the sensor(s) include an accelerometer), for example. If movement of the user relative to the computing device is detected, the relative movement may be a result of the user moving, and/or a result of the user moving the computing device, for example.

In response to the sensor(s) detecting the physical movement or the change in orientation, the display may be caused to either show the first information in the first field (if the display had initially obscured the first information), or obscure the first information in the first field (if the display had initially shown the first information) without obscuring the entirety of the display (block 208). The first information may be obscured by blurring the first information or blacking or graying out the first information, for example.

The method 200 may also include one or more additional blocks not shown in FIG. 3. For example, the method 200 may include a first additional block in which user authentication data entered by the user of the computing device, and associated with an account of the user (e.g., bank account, insurance policy/account, etc.), is received at the computing device (e.g., received via a user interface of the computing device). In this embodiment, the display may be provided at block 204 in response to receiving the user authentication data, and the field(s) of the display may be fields for displaying information associated with the account.

As another example, if the display initially shows the first information, and if the display screen is a touch screen, the method 200 may include a first additional block, occurring after block 208, in which the sensor(s) detect a single user gesture (e.g., a swipe) on the touch screen. In this embodiment, the method 200 may also include a second additional block in which, in response to the sensor(s) detecting the single user gesture, the display may be caused to again show the first information in the first field.

As another example, if the display initially shows the first information, the method 200 may include a first additional block, occurring after block 208, in which the sensor(s) detect a subsequent physical movement of the computing device and/or a subsequent change in orientation of the user of the computing device relative to the computing device. In this embodiment, the method 200 may also include a second additional block in which, in response to the sensor(s) detecting the subsequent physical movement or change in orientation, the display may be caused to again show the first information in the first field.

As another example, if the display initially obscures the first information, and if the display screen is a touch screen, the method 200 may include a first additional block, occurring after block 208, in which the sensor(s) detect a single user gesture (e.g., swipe) on the touch screen. In this embodiment, the method 200 may also include a second additional block in which, in response to the sensor(s) detecting the single user gesture, the display may be caused to again obscure the first information in the first field.

As yet another example, if the display initially obscures the first information, the method 200 may include a first additional block, occurring after block 208, in which the sensor(s) detect an expiration of a predetermined time limit (e.g., a time limit starting when the first information was revealed). In this embodiment, the method 200 may also include a second additional block in which, in response to the sensor(s) detecting the time limit expiration, the display is caused to again obscure the first information in the first field (without obscuring the entirety of the display).

As still another example, if the display initially obscures the first information, the method 200 may include a first additional block, occurring after block 208, in which the sensor(s) detect a subsequent physical movement of the computing device and/or a subsequent change in orientation of the user of the computing device relative to the computing device. In this embodiment, the method 200 may also include a second additional block in which, in response to the sensor(s) detecting the subsequent physical movement or change in orientation, the display is caused to again obscure the first information in the first field (without obscuring the entirety of the display).

Figure 4:
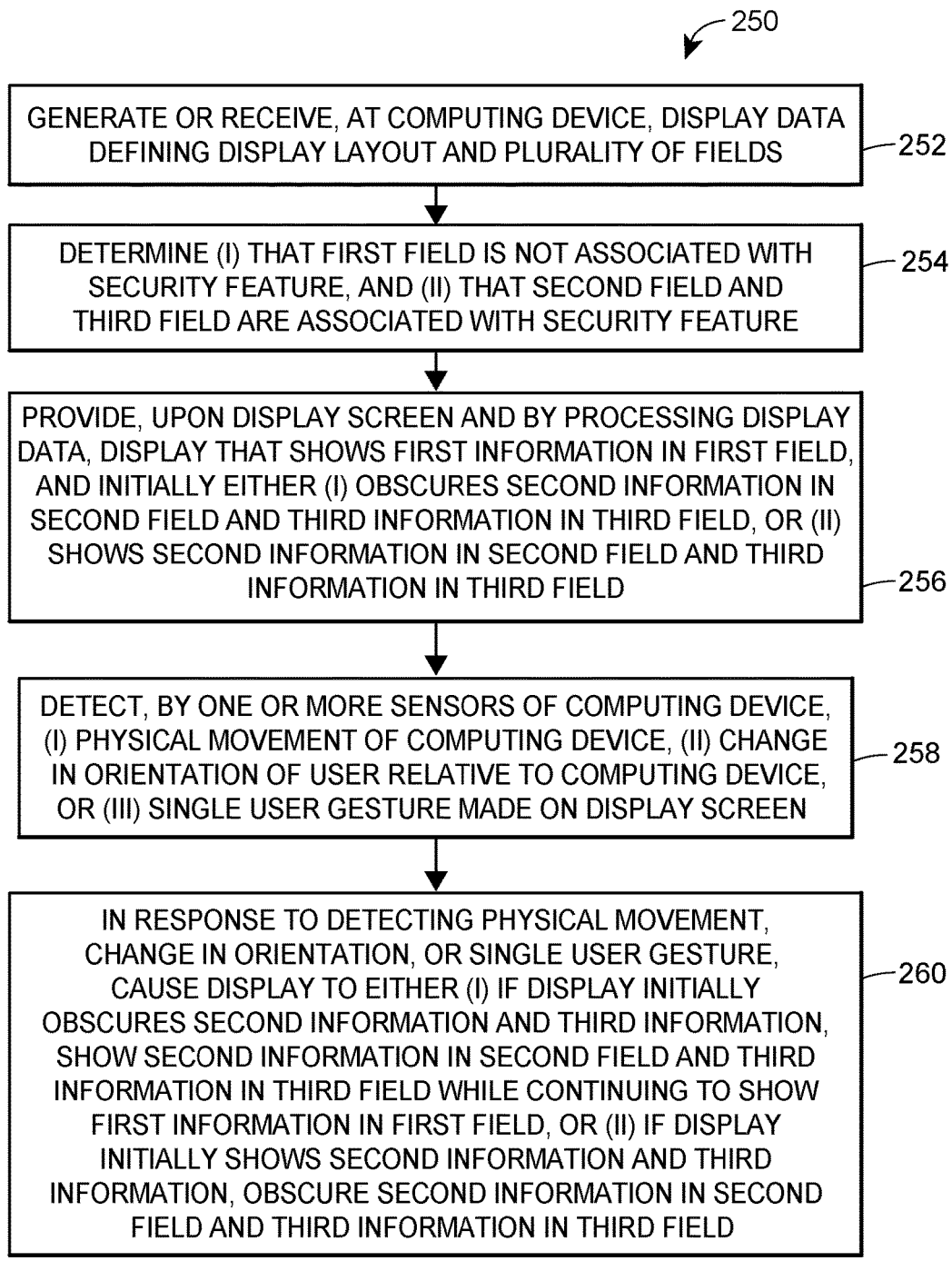
FIG. 4 depicts a flow diagram of an exemplary method for selectively obscuring and/or revealing sensitive information in multiple fields of a display of a computing device, according to an embodiment.

V. Exemplary Process Flow for Selectively Obscuring and/or Revealing Sensitive Information in Multiple Fields of a Computing Device Display FIG. 4 depicts a flow diagram of an exemplary method 250 for selectively obscuring and/or revealing sensitive information in multiple fields of a display of a computing device, according to one embodiment. The method 250 may correspond to a particular embodiment and/or scenario of the method 200 discussed above, and/or may be implemented in (e.g., performed by one or more processors of) a computing device such as the client device 12 of FIG. 1, for example.

In the method 250, display data defining a display layout and a plurality of fields may be generated, or received, at a computing device (block 252). The computing device may be similar to the client device 12 of FIG. 1 or the computing device 102 of FIGS. 2A and 2B, for example. The display data may be generated at the computing device if the device is executing an application similar to user account application 40 of FIG. 1, or may be received at the computing device if the display data is provided by a web page, for example.

The computing device may determine that a first field of the plurality of fields is not associated with a security feature, and that second and third fields of the plurality of fields are associated with the security feature (block 254). In some embodiments, the computing device may also determine that one or more additional fields of the plurality of fields are not associated with the security feature, and/or may also determine that one or more additional fields of the plurality of fields are associated with the security feature. In some embodiments, the determinations at block 254 may be made based upon field type indicators that are associated with the first, second and third fields. In other embodiments, the determinations may be made by processing data (e.g., flag values) associated with the information used to populate the fields. In these latter embodiments, for example, the first field may instead have been treated as a secure field, and/or the second and/or third fields may instead have been treated as non-secure fields, in a past iteration similar to the method 250.

A display may be provided upon a display screen of the computing device (e.g., display screen 54 of FIG. 1) by processing the generated or received display data (block 256). Initially, upon being shown to the user, the display may either obscure second information in the second field and third information in the third field (e.g., by blurring the second information and the third information, blacking out the information, etc.), or show the second information in the second field and the third information in the third field, without obscuring the first information in the first field. For example, a policy number in a policy number field and a coverage limit in a coverage limit field may initially both be obscured, while a coverage description in a coverage description field is shown.

A physical movement of the computing device, a change in the orientation of a user of the computing device relative to the computing device, and/or a single user gesture made on the display screen of the computing device may be detected by one or more sensors of the computing device (block 258). The sensor(s) may be similar to sensor(s) 56 of FIG. 1, for example. Detecting the physical movement, the change in orientation or the single user gesture may include detecting whether the user is looking at the display screen (e.g., if the sensor(s) include a camera that can sense the direction or focus of the user's gaze), detecting that the user has moved the computing device relative to the user (e.g., if the sensor(s) include a camera that can sense the position of the user's head and/or shoulders relative to the display screen), detecting that the computing device has been tilted (e.g., if the sensor(s) include an accelerometer), or detecting a swipe made by the user on the display screen (e.g., if the sensor(s) include a touch screen sensor of the display screen), for example.

In response to detecting the physical movement, the change in orientation or the single user gesture, the display may be caused to either show the second information in the second field and the third information in the third field (if the display had initially obscured the second information and the third information) while continuing to show the first information in the first field, or obscure the second information in the second field and the third information in the third field (if the display had initially shown the second information and the third information) while continuing to show the first information in the first field (block 260).

The method 250 may also include one or more additional blocks not shown in FIG. 4. For example, if the display initially shows the second information and third information, the method 250 may include a first additional block, occurring after block 260, in which the sensor(s) detect a subsequent physical movement of the computing device, a subsequent change in orientation of the user relative to the computing device, or a subsequent single user gesture made on the display screen. In this embodiment, the method 250 may also include a second additional block in which, in response to detecting the subsequent physical movement, change in orientation or single user gesture, the display is caused to either again obscure the second information in the second field and the third information in the third field (if the display currently shows the second information and the third information) while continuing to show the first information in the first field, or again show the second information in the second field and the third information in the third field (if the display currently obscures the second information and the third information) while continuing to show the first information in the first field.

Figure 5:
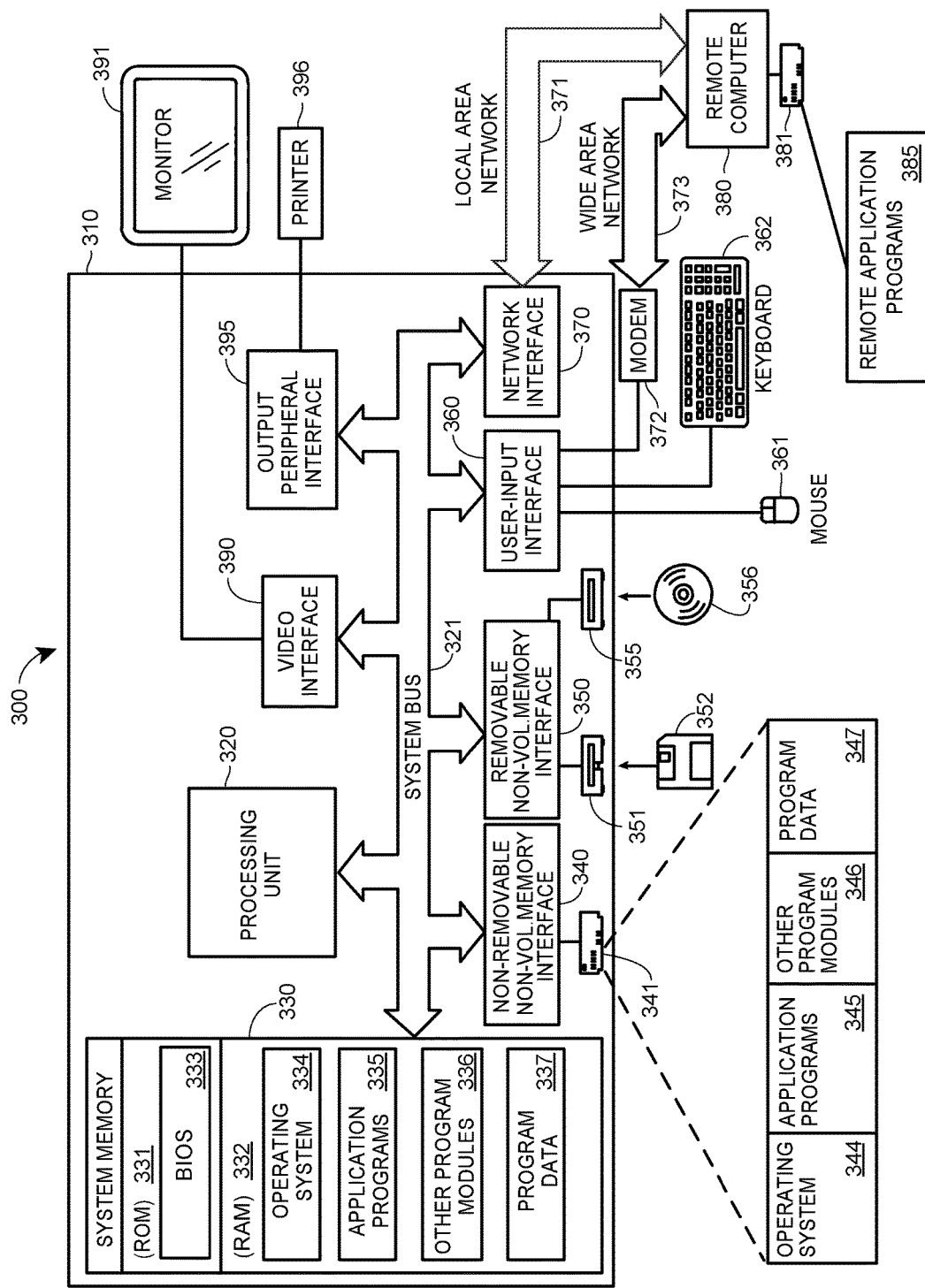
FIG. 5 depicts an exemplary computer system in which the techniques described herein may be implemented, according to an embodiment.

VI. Exemplary Computer System for Enabling a User to Selectively Obscure and/or Reveal Sensitive Information on a Computing Device Display FIG. 5 depicts an example computer system 300 in which the techniques described herein may be implemented, according to an embodiment. The computer system 300 of FIG. 5 includes a computing device in the form of a computer 310. Components of the computer 310 may include, but are not limited to, a processing unit 320, a system memory 330, and/or a system bus 321 that couples various system components including the system memory 330 to the processing unit 320. The system bus 321 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 310 may typically include a variety of computer-readable media. Computer-readable media can be any available media that can be accessed by computer 310 and includes both volatile and nonvolatile media, and both removable and non-removable media. By way of example, and not limitation, computer-readable media may comprise computer storage media and communication media. Computer storage media may include volatile and nonvolatile, removable and non-removable media implemented in any method or technology for storage of information such as computer-readable instructions, data structures, program modules or other data.

Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media may typically embody computer-readable instructions, data structures, program modules or other data in a modulated data signal, such as a carrier wave or other transport mechanism, and include any information delivery media. The term "modulated data signal" means a signal that has one or more of its characteristics set or changed in such a manner as to encode information in the signal. By way of example, and not limitation, communication media may include wired media, such as a wired network or direct-wired connection, and wireless media such as acoustic, radio frequency (RF), infrared and other wireless media. Combinations of any of the above are also included within the scope of computer-readable media.

The system memory 330 may include computer storage media in the form of volatile and/or nonvolatile memory, such as read only memory (ROM) 331 and random access memory (RAM) 332. A basic input/output system 333 (BIOS), containing the basic routines that help to transfer information between elements within computer 310, such as during start-up, may be typically stored in ROM 331. RAM 332 may typically contain data and/or program modules that are immediately accessible to, and/or presently being operated on, by processing unit 320. By way of example, and not limitation, FIG. 5 illustrates operating system 334, application programs 335, other program modules 336, and program data 337.

The computer 310 may also include other removable/non-removable, volatile/nonvolatile computer storage media. By way of example only, FIG. 5 illustrates a hard disk drive 341 that may read from or write to non-removable, nonvolatile magnetic media, a magnetic disk drive 351 that may read from or write to a removable, nonvolatile magnetic disk 352, and an optical disk drive 355 that may read from or write to a removable, nonvolatile optical disk 356, such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 341 may be connected to the system bus 321 through a non-removable memory interface such as interface 340, and magnetic disk drive 351 and optical disk drive 355 may be connected to the system bus 321 by a removable memory interface, such as interface 350.

The drives and their associated computer storage media discussed above and illustrated in FIG. 5 may provide storage of computer-readable instructions, data structures, program modules and other data for the computer 310. In FIG. 5, for example, hard disk drive 341 is illustrated as storing operating system 344, application programs 345, other program modules 346, and program data 347. Note that these components may either be the same as or different from operating system 334, application programs 335, other program modules 336, and/or program data 337. Operating system 344, application programs 345, other program modules 346, and/or program data 347 may be given different numbers here to illustrate that, at a minimum, they are different copies. A user may enter commands and information into the computer 310 through input devices such as cursor control device 361 (e.g., a mouse, trackball, touch pad, etc.) and keyboard 362. A monitor 391 or other type of display device may also be connected to the system bus 321 via an interface, such as a video interface 390. In addition to the monitor, computers may also include other peripheral output devices such as printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 5. The logical connections depicted in FIG. 5 may include a local area network (LAN) 371 and a wide area network (WAN) 373, and may also include other networks. Such networking environments are commonplace in hospitals, offices, enterprise-wide computer networks, intranets and the Internet.

When used in a LAN networking environment, the computer 310 is connected to the LAN 371 through a network interface or adapter 370. When used in a WAN networking environment, the computer 310 may typically include a modem 372 or other means for establishing communications over the WAN 373, such as the Internet. The modem 372, which may be internal or external, may be connected to the system bus 321 via the input interface 360, or other appropriate mechanism. The communications connections 370, 372, which allow the device to communicate with other devices, are an example of communication media, as discussed above. In a networked environment, program modules depicted relative to the computer 310, or portions thereof, may be stored in the remote memory storage device 381. By way of example, and not limitation, FIG. 5 illustrates remote application programs 385 as residing on memory device 381.

The techniques for enabling a user to selectively obscure and/or reveal sensitive information described above may be implemented in part or in their entirety within a computer system, such as the computer system 300 illustrated in FIG. 5. The computer 310 may be a portable/mobile or stationary computing device of a customer (e.g., the client device 12 of FIG. 1), and the remote computer 380 may be a server device associated with a bank, employer, insurance provider or other entity (e.g., a server within the computing system 14 of FIG. 1), for example. In some such embodiments, the LAN 371 may be omitted (e.g., communications between computer 310 and computer 380 may only occur via WAN 373). Application programs 335 and 345 may include the user account application 40 of FIG. 1 and/or a web browser application, for example. Remote computer 380 may receive user authentication information (e.g., login and password) from computer 310, authenticate the user authentication information, and provide the appropriate account data to computer 310 as discussed above, for example. As another example, computer 310 may provide the user with a display such as the display 100 of FIGS. 2A and 2B via monitor 391 (or a touch screen, etc.), and may cause the information in the appropriate fields to be obscured and/or revealed as described above.

VII. Exemplary Method Embodiments

In one aspect, a computer-implemented method may include generating or receiving, at a computing device, display data defining a display layout and one or more fields. The method may also include providing, upon a display screen of the computing device and by processing the display data, a display that initially either (i) obscures first information in a first field of the one or more fields without obscuring an entirety of the display, or (ii) shows the first information in the first field. The method may also include detecting, by one or more sensors of the computing device, (i) a physical movement of the computing device, or (ii) a change in orientation of a user of the computing device relative to the computing device. The method may also include, in response to the one or more sensors detecting the physical movement or the change in orientation, causing the display to either (i) if the display initially obscures the first information in the first field, show the first information in the first field, or (ii) if the display initially shows the first information in the first field, obscure the first information in the first field without obscuring the entirety of the display, respectively. As a result, enhanced security for sensitive or confidential information may be provided. The method may include additional, fewer or alternative actions, such as any of those discussed elsewhere herein.

For instance, detecting a physical movement or a change in orientation may include detecting whether the user is looking at the display screen of the computing device, detecting that the user has moved the computing device relative to the user, or detecting that the computing device has been tilted.

Additionally or alternatively, providing a display may include providing a display that initially shows the first information in the first field, and causing the display to either show the first information or obscure the first information may include causing the display to obscure the first information in the first field without obscuring the entirety of the display.

Additionally or alternatively, the display screen may be a touch screen, and the method may further include, after causing the display to obscure the first information in the first field, detecting, by the one or more sensors, a single user gesture made on the touch screen, and, in response to the one or more sensors detecting the single user gesture, causing the display to again show the first information in the first field.

Additionally or alternatively, the method may further include, after causing the display to obscure the first information in the first field, detecting, by the one or more sensors, (i) a subsequent physical movement of the computing device or (ii) a subsequent change in orientation of the user of the computing device relative to the computing device, and, in response to the one or more sensors detecting the subsequent physical movement or the subsequent change in orientation, causing the display to again show the first information in the first field.

Additionally or alternatively, detecting a physical movement or a change in orientation may include detecting that the user is no longer looking at the display screen of the computing device, and detecting a subsequent physical movement or a subsequent change in orientation may include detecting that the user is again looking at the display screen of the computing device.

Additionally or alternatively, providing a display may include providing a display that initially obscures the first information in the first field without obscuring the entirety of the display, and causing the display to either show the first information or obscure the first information may include causing the display to show the first information in the first field.

Additionally or alternatively, the method may further include, after causing the display to show the first information in the first field, detecting, by the one or more sensors, an expiration of a predetermined time limit, and, in response to the one or more sensors detecting the expiration of the predetermined time limit, causing the display to again obscure the first information in the first field without obscuring the entirety of the display.

Additionally or alternatively, the display screen may be a touch screen, and the method may further include, after causing the display to show the first information in the first field, detecting, by the one or more sensors, a single user gesture made on the touch screen, and, in response to the one or more sensors detecting the single user gesture, causing the display to again obscure the first information in the first field without obscuring the entirety of the display.

Additionally or alternatively, the method may further include, after causing the display to show the first information in the first field, detecting, by the one or more sensors, (i) a subsequent physical movement of the computing device or (ii) a subsequent change in orientation of the user of the computing device relative to the computing device, and, in response to the one or more sensors detecting the subsequent physical movement or the subsequent change in orientation, causing the display to again obscure the first information in the first field without obscuring the entirety of the display.

Additionally or alternatively, the method may further include receiving, at the computing device, user authentication data entered by the user of the computing device and associated with an account, providing the display may be in response to receiving the user authentication data, and the one or more fields may be for displaying information associated with the account.

In another aspect, a computer-implemented method may include generating or receiving, at a computing device, display data defining a display layout and a plurality of fields. The method may also include determining, by the computing device, (i) that a first field of the plurality of fields is not associated with a security feature, and (ii) that a second field and a third field of the plurality of fields are associated with the security feature. The method may also include providing, upon a display screen of the computing device and by processing the display data, a display that shows first information in the first field, and initially either (i) obscures second information in the second field and third information in the third field, or (ii) shows the second information in the second field and the third information in the third field. The method may also include detecting, by one or more sensors of the computing device, (i) a physical movement of the computing device, (ii) a change in orientation of a user of the computing device relative to the computing device, or (iii) a single user gesture made on the display screen of the computing device. The method may also include, in response to detecting the physical movement, the change in orientation, or the single user gesture, causing the display to either (i) if the display initially obscures the second information in the second field and the third information in the third field, show the second information in the second field and the third information in the third field while continuing to show the first information in the first field, or (ii) if the display initially shows the second information in the second field and the third information in the third field, obscure the second information in the second field and the third information in the third field while continuing to show the first information in the first field. The method may include additional, fewer or alternative actions, such as any of those discussed elsewhere herein.

For instance, detecting a physical movement, a change in orientation, or a single user gesture may include detecting whether the user is looking at the display screen, detecting that the user has moved the computing device relative to the user, detecting that the computing device has been tilted, or detecting a swipe by the user on the display screen of the computing device.

Additionally or alternatively, the method may further include, after causing the display to either show the second information and the third information or obscure the second information and the third information, detecting, by the one or more sensors of the computing device, (i) a subsequent physical movement of the computing device, (ii) a subsequent change in orientation of the user of the computing device relative to the computing device, or (iii) a subsequent single user gesture made on the display screen of the computing device, and, in response to detecting the subsequent physical movement, the subsequent change in orientation, or the subsequent single user gesture, causing the display to either (i) if the display currently shows the second information in the second field and the third information in the third field, again obscure the second information in the second field and the third information in the third field while continuing to show the first information in the first field, or (ii) if the display currently obscures the second information in the second field and the third information in the third field, again show the second information in the second field and the third information in the third field while continuing to show the first information in the first field.

VIII. Exemplary Computing Device Embodiments

In another aspect, a computing device may include a display screen, one or more sensors, one or more processors and a non-transitory, computer-readable memory storing instructions. The instructions may, when executed by the one or more processors, cause the computing device to generate or receive display data defining a display layout and one or more fields. The instructions may also cause the computing device to provide, upon the display screen and by processing the display data, a display that initially either (i) obscures first information in a first field of the one or more fields without obscuring an entirety of the display, or (ii) shows the first information in the first field. The instructions may also cause the computing device to, in response to the one or more sensors detecting (i) a physical movement of the computing device, or (ii) a change in orientation of a user of the computing device relative to the computing device, cause the display to either, if the display initially obscures the first information in the first field, show the first information in the first field, or, if the display initially shows the first information in the first field, obscure the first information in the first field without obscuring the entirety of the display. The computing device may include additional, fewer or alternative components, and/or components with additional, less or alternative functionality, such as any of the components and/or functionality discussed elsewhere herein.

For instance, the one or more sensors may be configured to detect the physical movement or the change in orientation at least in part by detecting whether the user is looking at the display screen, detecting that the user has moved the computing device relative to the user, or detecting that the computing device has been tilted.

Additionally or alternatively, the instructions may cause the computing device to provide a display that initially shows the first information in the first field, and, in response to the one or more sensors detecting the physical movement or the change in orientation, cause the display to obscure the first information in the first field without obscuring the entirety of the display.

Additionally or alternatively, the one or more sensors may be configured to detect whether the user is looking at the display screen, and the instructions may cause the computing device to cause the display to obscure the first information in the first field in response to the one or more sensors detecting that the user is no longer looking at the display screen, and, after causing the display to obscure the first information in the first field, and in response to the one or more sensors detecting the user is again looking at the display screen, cause the display to again show the first information in the first field.

Additionally or alternatively, the display screen may be a touch screen, the one or more sensors may be configured to detect user gestures on the touch screen, and the instructions may cause the computing device to, after causing the display to obscure the first information in the first field and in response to the one or more sensors detecting a single user gesture made on the touch screen, cause the display to again show the first information in the first field.

Additionally or alternatively, the instructions may cause the computing device to provide a display that initially obscures the first information in the first field, and, in response to the one or more sensors detecting the physical movement or the change in orientation, cause the display to show the first information in the first field.

Additionally or alternatively, the instructions may cause the computing device to, after causing the display to show the first information in the first field, detect an expiration of a predetermined time limit, and, in response to detecting the expiration of the predetermined time limit, cause the display to again obscure the first information in the first field without obscuring the entirety of the display.

Additionally or alternatively, the display screen may be a touch screen, the one or more sensors may be configured to detect user gestures on the touch screen, and the instructions may cause the computing device to, after causing the display to show the first information in the first field and in response to the one or more sensors detecting a single user gesture made on the touch screen, cause the display to again obscure the first information in the first field without obscuring the entirety of the display.

IX. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process of enabling a user to selectively obscure and/or reveal sensitive information on a computing device display through the principles disclosed herein. Thus, while particular embodiments and applications have been illustrated and described, it is understood that the disclosed embodiments are not limited to the precise construction and components disclosed herein. Various modifications, changes and variations, which will be apparent to those skilled in the art, may be made in the arrangement, operation and details of the methods and systems disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:

1. A computer-implemented method of selectively obscuring sensitive information on a computer display, the method comprising:
    generating or receiving, at a computing device, display data defining a display layout and one or more fields;
    providing, on a display screen of the computing device and by processing the display data, a display that initially obscures a first item of information in a first secure field of the one or more fields without obscuring an entirety of the display;
    detecting, using at least a camera of the computing device, a change in orientation of a user of the computing device relative to the computing device;
    in response to the change in orientation,
        causing the display to show the first item of information in the first secure field; and
        after causing the display to show the first item of information in the first secure field, (i) detecting an expiration of a predetermined time limit, and (ii) in response to detecting the expiration of the predetermined time limit, causing the display to again obscure the first item of information in the first secure field without obscuring the entirety of the display.

2. The computer-implemented method of claim 1, the method further comprising:
    detecting, at the computing device, whether the user is looking at the display screen,
    wherein causing the display to show the first item of information in the first secure field is in response to detecting (i) the change in orientation, and (ii) whether the user is looking at the display screen.

3. The computer-implemented method of claim 1, the method further comprising:
    detecting, at the computing device, whether the user is looking at the display screen.

4. The computer-implemented method of claim 3, wherein causing the display to show the first item of information in the first secure field is in response to detecting the change in orientation and detecting whether the user is looking at the display screen.

5. The computer-implemented method of claim 1, the method further comprising:
    generating or receiving, at the computing device, one or more items of information, wherein each item of information (i) is to be displayed in a respective field of the one or more fields, and (ii) has an associated data flag that designates whether the item of information is sensitive.

6. The computer-implemented method of claim 5, the method further comprising:
   determining one or more secure fields, at least by, for each field of the one or more fields,
      processing the data flag associated with the item of information to be displayed in the field, and
      if the data flag designates that the item of information is sensitive, designating the field as a secure field.

7. The computer-implemented method of claim 6, the method further comprising:
   detecting, at the computing device, whether the user is looking at the display screen.

8. The computer-implemented method of claim 7, wherein causing the display to show the first item of information in the first secure field is in response to detecting the change in orientation and detecting the change in orientation and detecting whether the user is looking at the display screen.

9. The computer-implemented method of claim 1, the method further comprising:
   receiving, at the computing device, user authentication data entered by the user of the computing device and associated with an account,
   wherein providing the display is in response to receiving the user authentication data, and
   wherein the one or more fields are for displaying information associated with the account.

10. A computer device configured to selectively obscure sensitive information on a display screen, the computer device comprising:
   a display screen;
   a camera;
   one or more processors; and
   a non-transitory, computer-readable memory storing instructions that, when executed by the one or more processors, cause the computing device to:
      generate or receive, at the computing device, display data defining a display layout and one or more fields;
      provide, on the display screen of the computing device and by processing the display data, a display that initially obscures a first item of information in a first secure field of the one or more fields without obscuring an entirety of the display;
      detect, using at least a camera of the computing device, a change in orientation of a user of the computing device relative to the computing device;
      in response to the change in orientation,
         cause the display to show the first item of information in the first secure field; and
         after causing the display to show the first item of information in the first secure field, (i) detect an expiration of a predetermined time limit, and (ii) in response to detecting the expiration of the predetermined time limit, cause the display to again obscure the first item of information in the first secure field without obscuring the entirety of the display.

11. The computer device of claim 10, wherein the instructions cause the computing device to:
   detect, using the camera, whether the user is looking at the display screen; and
   cause the display to show the first item of information in the first secure field in response to detecting (i) the change in orientation, and (ii) whether the user is looking at the display screen.

12. The computer device of claim 10, wherein the instructions cause the computing device to detect whether the user is looking at the display screen.

13. The computer device of claim 12, wherein the instructions cause the computing device to cause the display to show the first item of information in the first secure field in response to detecting the change in orientation and detecting whether the user is looking at the display screen.

14. The computer device of claim 10, wherein the instructions cause the computing device to:
   generate or receive, at the computing device, one or more items of information, wherein each item of information (i) is to be displayed in a respective field of the one or more fields, and (ii) has an associated data flag that designates whether the item of information is sensitive.

15. The computer device of claim 14, wherein the instructions cause the computing device to:
   determine one or more secure fields, at least by, for each field of the one or more fields:
      processing the data flag associated with the item of information to be displayed in the field, and
      if the data flag designates that the item of information is sensitive, designating the field as a secure field.

16. The computer device of claim 15, wherein the instructions cause the computing device to detect whether the user is looking at the display screen.

17. The computer device of claim 16, wherein the instructions cause the computing device to cause the display to show the first item of information in the first secure field in response to detecting the change in orientation and detecting whether the user is looking at the display screen.

18. The computer device of claim 10, wherein the instructions cause the computing device to:
   receive, at the computing device, user authentication data entered by the user of the computing device and associated with an account,
   wherein providing the display is in response to receiving the user authentication data, and
   wherein the one or more fields are for displaying information associated with the account.

19. A computer-implemented method of selectively obscuring sensitive information on a computer display, the method comprising:
   generating or receiving, at a computing device, display data defining a display layout and one or more fields;
   providing, on a display screen of the computing device and by processing the display data, a display that initially obscures a first item of information in a first secure field of the one or more fields without obscuring an entirety of the display;
   detecting, using the computing device, a change in orientation of a user of the computing device relative to the computing device;
   in response to the change in orientation,
      causing the display to show the first item of information in the first secure field; and
      after causing the display to show the first item of information in the first secure field, (i) detecting an expiration of a predetermined time limit, and (ii) in response to detecting the expiration of the predetermined time limit, causing the display to again obscure the first item of information in the first secure field without obscuring the entirety of the display.

20. The computer-implemented method of claim 19, the method further comprising:

detecting, at the computing device, whether the user is looking at the display screen, wherein causing the display to show the first item of information in the first secure field is in response to detecting (i) the change in orientation, and (ii) whether the user is looking at the display screen.

\* \* \* \* \*